United States Patent
Fan et al.

(10) Patent No.: US 11,126,334 B2
(45) Date of Patent: Sep. 21, 2021

(54) METHOD, DEVICE AND STORAGE MEDIUM FOR INPUTTING DATA

(71) Applicant: BEIJING XIAOMI MOBILE SOFTWARE CO., LTD., Beijing (CN)

(72) Inventors: Lin Fan, Beijing (CN); Zhanwei Luo, Beijing (CN); Ming Liu, Beijing (CN); Xinyue Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,608

(22) Filed: Nov. 30, 2019

(65) Prior Publication Data
US 2021/0055854 A1    Feb. 25, 2021

(30) Foreign Application Priority Data
Aug. 20, 2019  (CN) .......................... 201910769042.4

(51) Int. Cl.
*G06F 3/0484*    (2013.01)
*G06F 3/0488*    (2013.01)

(52) U.S. Cl.
CPC ...... *G06F 3/04842* (2013.01); *G06F 3/04847* (2013.01); *G06F 3/04886* (2013.01)

(58) Field of Classification Search
CPC ............. G06F 3/04842; G06F 3/04847; G06F 3/04886
See application file for complete search history.

(56) References Cited

U.S. PATENT DOCUMENTS

2007/0079252 A1*  4/2007  Ramnani ................. G06F 9/451
                                                              715/781
2010/0141590 A1*  6/2010  Markiewicz .......... G06F 3/0488
                                                              345/173

(Continued)

FOREIGN PATENT DOCUMENTS

CN    1755603 A     4/2006
CN    102246134 A   11/2011

(Continued)

OTHER PUBLICATIONS

State Intellectual Property Office of the People's Republic of China, Office Action and Search Report Issued in Application No. 2019107690424, dated Aug. 26, 2020, 20 pages, (Submitted with Machine Translation).

(Continued)

*Primary Examiner* — Jennifer N To
*Assistant Examiner* — Reji Kartholy
(74) *Attorney, Agent, or Firm* — Syncoda LLC; Feng Ma

(57) ABSTRACT

A method of processing data includes: in response to acquiring an instruction to display an input method window, a target input method window is displayed, where the target input method window includes a soft keyboard area and a height increasing area, and the height increasing area is located at the bottom of the soft keyboard area, and is configured to raise the soft keyboard area; a floating window containing data to be pasted is displayed at a designated position of the target input method window; and when a paste instruction is triggered based on an operation on the floating window, a response is made to the paste instruction.

18 Claims, 8 Drawing Sheets

(56) References Cited

U.S. PATENT DOCUMENTS

| | | | |
|---|---|---|---|
| 2015/0363069 A1* | 12/2015 | Okamoto | G06F 3/0488 |
| | | | 345/156 |
| 2017/0102871 A1* | 4/2017 | Won | G06F 3/04886 |
| 2017/0329751 A1* | 11/2017 | Ozzie | G06F 40/134 |
| 2019/0057671 A1* | 2/2019 | Baer | G09G 5/373 |
| 2020/0167068 A1 | 5/2020 | Tao et al. | |

FOREIGN PATENT DOCUMENTS

| | | |
|---|---|---|
| CN | 106055202 A | 10/2016 |
| CN | 108885535 A | 11/2018 |
| CN | 109375983 A | 2/2019 |
| CN | 109683794 A | 4/2019 |
| CN | 109710086 A | 5/2019 |
| CN | 110119239 A | 8/2019 |
| EP | 2975508 A1 | 1/2016 |
| EP | 3614250 A1 | 2/2020 |
| KR | 20130122257 A | 11/2013 |
| WO | 2018223558 A1 | 12/2018 |

OTHER PUBLICATIONS

European Patent Office, Extended European Search Report Issued in Application No. 19218236.8, dated Jun. 29, 2020, Germany, 10 pages.

Joao Carrasqueira: "SwiftKey for Android now offers custom resizing options", XP055704140, retrieved from the Internet:URL: https://www.neowin.net/news/swiftkey-for-android-now-offers-custom-resizing-options/, Mar. 29, 2019, 1 page.

Thao Huynh:"Swiftkey Keyboard | Worth The Switch?", XP054980562, Retrieved from the Internet: URL: https://www.youtube.com/watch?v=IHYdPZAIiVs, Jul. 26, 2018, 1 page.

\* cited by examiner

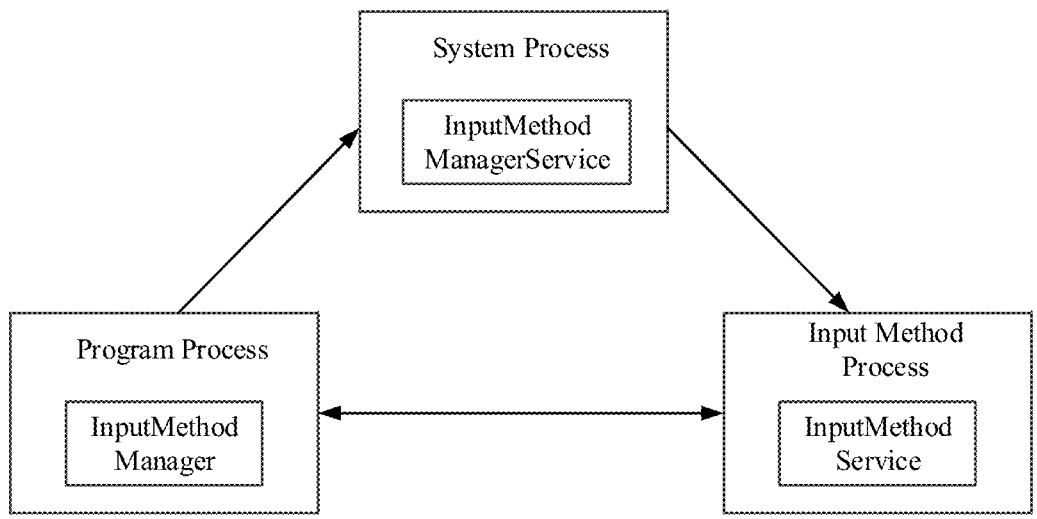

FIG. 1

| | |
|---|---|
| In response to acquiring an instruction to display an input method window, display a target input method window, where the target input method window comprises a soft keyboard area and a height increasing area, and the height increasing area is located at a bottom of the soft keyboard area, and is configured to raise the soft keyboard area | 202 |
| Display a floating window containing data to be pasted at a designated position of the target input method window | 204 |
| When a paste instruction is triggered based on an operation on the floating window, respond to the paste instruction | 206 |

FIG. 2A

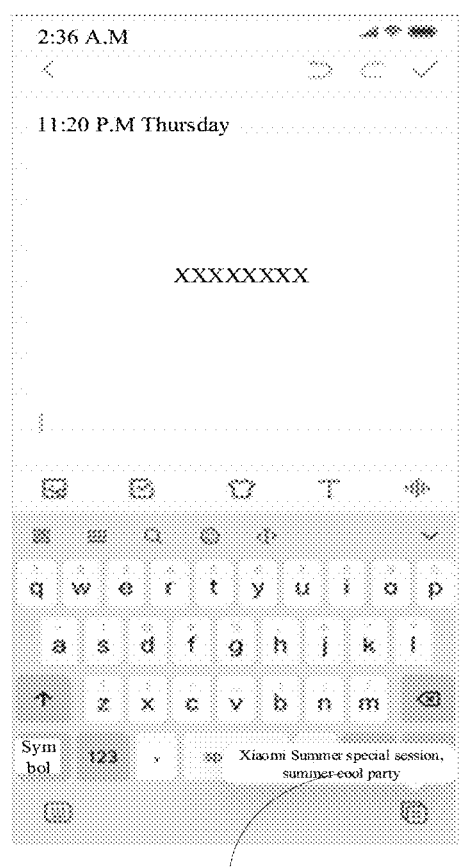
Third floating window      First floating window
FIG. 3B
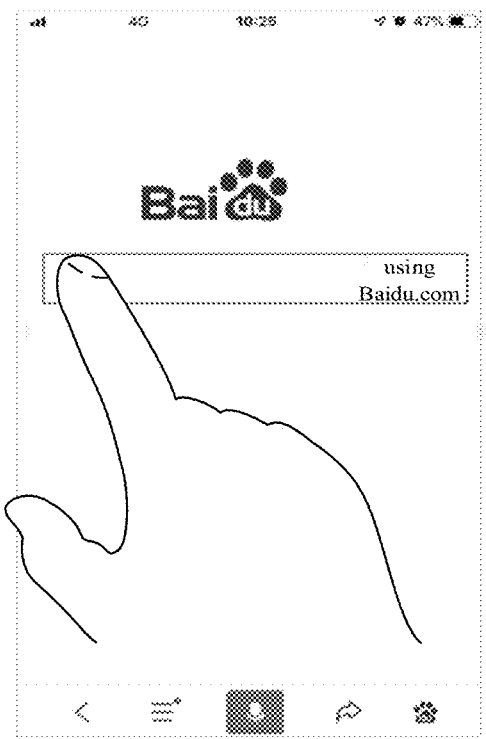
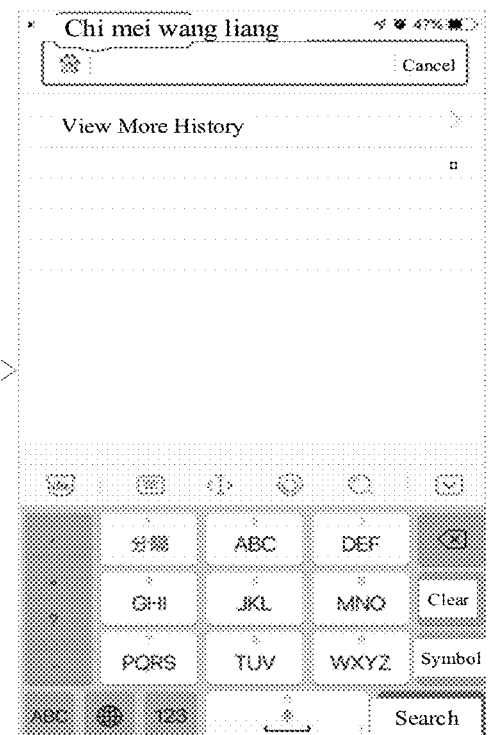
FIG. 3C

METHOD, DEVICE AND STORAGE MEDIUM FOR INPUTTING DATA

CROSS-REFERENCE TO RELATED APPLICATION

This application claims priority to Chinese Patent Application No. 201910769042.4 filed on Aug. 20, 2019, the disclosure of which is hereby incorporated herein by reference in its entirety.

BACKGROUND

With the development of input methods, input methods have become indispensable tools in users' daily lives. They not only serve as the basic tools for users to communicate through terminal devices, but also increasingly developed into communication media for human-computer interaction.

SUMMARY

The present disclosure relates generally to the fields of terminal technologies, and more specifically to a method and an apparatus of processing data, a device, and a storage medium.

According to a first aspect of the examples of the present disclosure, there is provided a method of processing data. The method includes:

in response to acquiring an instruction to display an input method window, displaying a target input method window, where the target input method window includes a soft keyboard area and a height increasing area, and the height increasing area is located at a bottom of the soft keyboard area, and is configured to raise the soft keyboard area;

displaying a floating window containing data to be pasted at a designated position of the target input method window, wherein the data to be pasted is data newly added to a clipboard; and when a paste instruction is triggered based on an operation on the floating window, responding to the paste instruction.

According to a second aspect of the examples of the present disclosure, there is provided an apparatus of processing data, the apparatus including:

a window display module configured to display a target input method window in response to acquiring an instruction to display an input method window, and display a floating window containing data to be pasted at a designated position of the target input method window; where the target input method window includes a soft keyboard area and a height increasing area, the height increasing area is located at the bottom of the soft keyboard area, and is configured to raise the soft keyboard area; and the data to be pasted is data newly added to a clipboard; and a data pasting module configured to, when a paste instruction is triggered based on an operation on the floating window, respond to the paste instruction.

According to a third aspect of the examples of the present disclosure, there is provided an electronic device, including: a processor and a memory storing processor executable instructions; wherein the processor is configured to perform the steps of the method of processing data described above.

According to a fourth aspect of the examples of the present disclosure, there is provided a computer readable storage medium storing a computer program, when executing the computer program, a processor is caused to perform the method of processing data described above.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this disclosure, illustrate examples consistent with the present disclosure and, together with the description, serve to explain the principles of the disclosure.

FIG. 1 is a schematic diagram of a framework of an input method system according to some embodiments of the present disclosure.

FIG. 2A is a flowchart of a method of processing data according to some embodiments of the present disclosure.

FIG. 3B is a schematic diagram showing a comparison of a first floating window and a third floating window according to some embodiments of the present disclosure.

FIG. 3C is a schematic diagram showing a display position of a floating window according to some embodiments of the present disclosure.

DETAILED DESCRIPTION

Figure 2B:
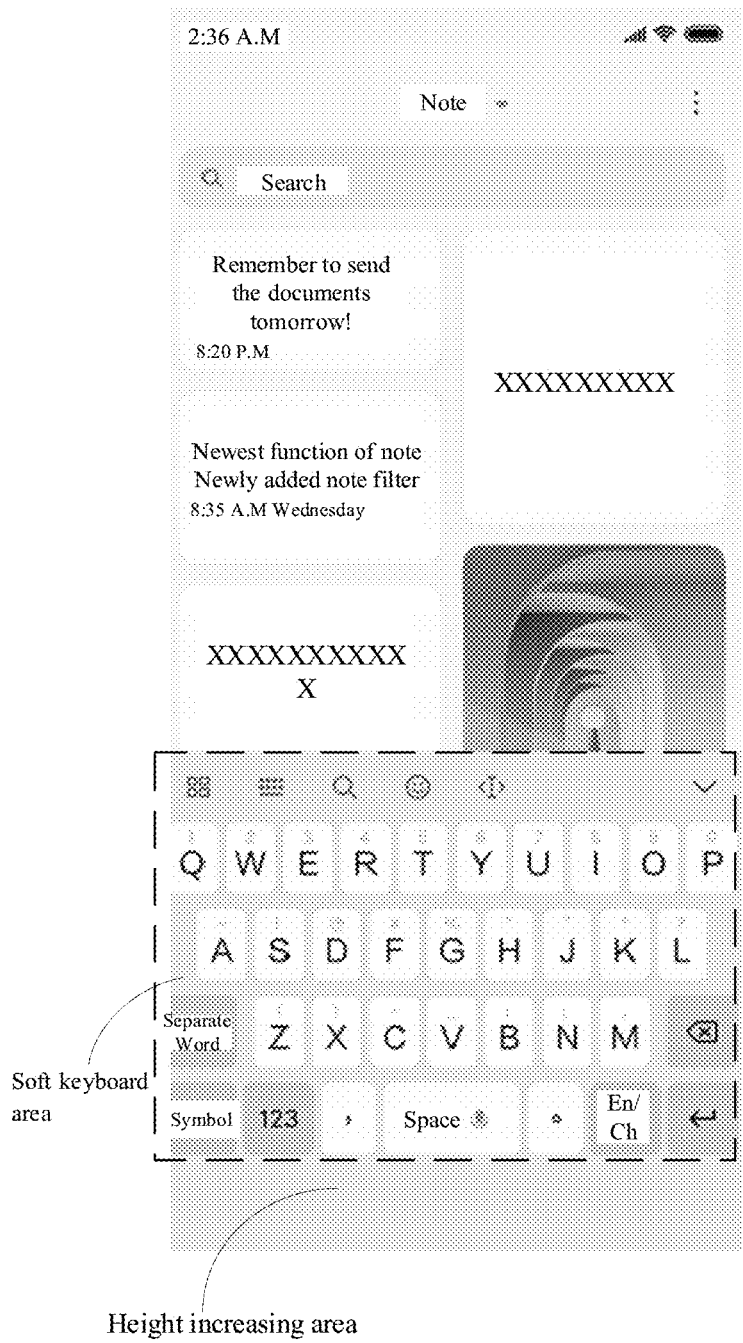
FIG. 2B is a schematic diagram of a soft keyboard area and a height increasing area according to some embodiments of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a," "the" and "said" in their singular forms in the present disclosure and the appended claims are also intended to include plurality or multiple, unless clearly indicated otherwise in the context. It should also be understood that the term "and/or" as used herein is and includes any and all possible combinations of one or more of the associated listed items.

It is to be understood that, although terms "first," "second," "third" and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

An input method is a tool that provides input to other modules in a system. The input method can be considered as a character generator that converts input data touch events or key pressing events into other various characters. Taking the Android system as an example, the input method can be installed, which means that the system can have multiple input methods (for example, a Segou input method, a Baidu input method), but only one is activated. Users can switch between different input methods. At the same time, the input method can be run in the form of a service. The input method can only serve for one program at a time, and only the program running in the front end can receive the input data from the input method.

As shown in FIG. 1, taking the Android system as an example, the overall framework of the input method system may include: InputMethodManager in the program process, InputMethodManagerService in the system process, and InputMethodService in the input method process. The InputMethodManagerService (also known as IMMS) is responsible for managing all input methods of the system, including loading and switching the input method service (Input Method Service, IMS for short). When the program acquires the focus, the program can notify the InputMethodManagerService that the program has acquired the focus through the InputMethodManager and can request to bind the program to the current input method. At the same time, when a View of the program that requires the input method (such as EditorView) acquires the focus, the program can request the InputMethodManagerService through the InputMethodManager to display the input method. At this time, after receiving the request, the InputMethodManagerService can send a data communication interface of the requested EditText to the current input method and request to display the input method. After receiving the request, the input method can display its own input method window, and store the data structure of the target view. When the user performs the input, the character is directly transmitted to the corresponding View through the data communication interface of the View.

When an input method window is displayed, a soft keyboard area is often displayed at the bottom of a screen. The inventors of the present disclosures have recognized that with the development of the full screen technology and the terminal technology, a distance between the bezel of the screen and the bezel of the terminal device is getting ever smaller, and a distance from the soft keyboard area to the lower bezel of the terminal device is getting ever smaller. As the screen of the terminal device becomes increasingly large, when a user holds the terminal device and inputs content using an input method, the user has to hold the bottom of the terminal device to operate, so that the user cannot have a comfortable input experience.

Various embodiments of the present disclosure provide a solution capable of raising a soft keyboard area. By arranging a height increasing area at the bottom of a soft keyboard area of an input method window, the soft keyboard manipulation area can be adjusted to a height suitable for operation, so that when the user inputs content, the touch range of the finger and the grip feeling of the terminal device are made more comfortable and ergonomic, thereby providing a comfortable input experience. Moreover, a floating window containing data to be pasted can also be displayed at a designated position of the target input method window, and when a paste instruction is triggered based on the operation of the floating window, a response is made to the paste instruction, thereby quickly pasting data.

As shown in FIG. 2A is a flowchart of a method of processing data according to some embodiments of the present disclosure. The method includes the following steps 202-206.

At step 202, in response to acquiring an instruction to display an input method window, a target input method window is displayed. The target input method window includes a soft keyboard area and a height increasing area, and the height increasing area is located at the bottom of the soft keyboard area, and is used for raising the soft keyboard area.

At step 204, a floating window containing data to be pasted is displayed at a designated position of the target input method window, where the data to be pasted is data newly added to a clipboard;

At step 206, if a paste instruction is triggered based on an operation on the floating window, a response is made to the paste instruction. Triggering a paste instruction based on an operation of the floating window may include detecting that a paste instruction is triggered based on the floating window.

The method of processing data provided in this example may be implemented by software, or may be implemented by combining software and hardware or by hardware. The hardware involved may be composed of multiple physical entities or may be composed of one physical entity. For example, the method of processing data can be applied to a smart terminal having a paste requirement, and the smart terminal includes one of a smart phone, a tablet computer, a PDA (Personal Digital Assistant), an e-book reader, a multimedia player, and the like. In some embodiments in which the method of processing data is implemented by software, the method of processing data can be implemented by a processor in the smart terminal.

The input method application may be a software in which one or more input modes such as voice, handwriting, pinyin, strokes, and double spelling are integrated. The soft keyboard area referred to in this example may be a keyboard area provided by an input method application, and is a manipulation area for providing input information. For example, the soft keyboard area may be a keyboard area occupying a bottom area of the screen in the related art, and for this reason, the soft keyboard area may be referred to as a normal keyboard area or a conventional keyboard area. For example, the soft keyboard area may include a keyboard area where a plurality of input modes such as Pinyin 9 key, Pinyin 26 key, Wubi 9 key, Wubi 26 key, stroke keyboard, handwriting keyboard, voice keyboard, and the like are provided. As shown in FIG. 2B, a soft keyboard area of a QWERTY keyboard is illustrated, and the user can implement an input operation based on buttons in the soft keyboard area.

Regarding the height increasing area, one of the purposes of setting the height increasing area is to increase the height of the soft keyboard area (may be referred to as the keyboard manipulation area of the input method) in the screen, so that when the user inputs content using the soft keyboard, the touch range of the finger and the grip feeling of the terminal device are made more comfortable and ergonomic. The height increasing area may be an extended area of the soft keyboard area or a separate area. The background of the height increasing area may be the same as or different from the background of the soft keyboard area. For the case where the background of the height increasing area is different from the background of the soft keyboard area, the transparency of the height increasing area can be a designated transparency. In some embodiments, the transparency of the height increasing area can be 100%, that is, the height increasing area is a transparent area so that the user can see the information in the next layer of window.

In some embodiments, the height increasing area may be a blank area. As shown in FIG. 2B, in the schematic diagram, the background of the height increasing area is the same as the background of the soft keyboard area, thereby achieving a uniform style with the original soft keyboard area.

Regarding the target input method window, in some embodiments, an input method application is newly designed. For the layout of the input method application, the target input method window includes a soft keyboard area and a height increasing area, and the height increasing area is at the bottom of the soft keyboard area. Therefore, an input method application with a raised soft keyboard area is designed to allow adjusting the manipulation area of the soft keyboard to a height suitable for operation, so that when the user inputs content, the touch range of the finger and the grip feeling of the terminal device are made more comfortable and ergonomic, thereby providing a comfortable input experience.

In some application scenarios, one or more input method applications may be installed in the smart terminal, and the input method application to be started may be a system-level application or a third-party application, and it cannot be guaranteed that the input method that the user desires to start is the newly designed input method application. In this regard, in another example, a system level scheme for increasing the height of the soft keyboard area of the input method is also provided. On the basis of the original input method window corresponding to the input method application, a height increasing area having a designated height is added at the bottom of the soft keyboard area to obtain a target input method window.

In this example, there is no need to newly design an input method application, and the layout of the input method application to be started is changed from the perspective of the system. On the basis of the original input method window corresponding to the input method application, a height increasing area having a designated height is added at the bottom of the soft keyboard area to obtain a target input method window, thereby increasing the height of the input method keyboard and improving the user's experience in manipulating the input method.

In some embodiments, when the target input method window is required to be displayed, a height increasing area having a designated height is added to the bottom of the soft keyboard area of the original input method window to form the target, and the layout of the original input method window corresponding to the input method application is changed, so as to use the adjusted layout information to display the target input method window.

In this example, by changing the layout, it is possible to increase the height of the input method keyboard without newly designing an input method application, thereby improving the user's experience in manipulating the input method, and allowing to add a height increasing area for various input method applications.

For example, the layout information can be intercepted by the Hook mechanism to change the layout of the original input method window corresponding to the input method application. Specifically, adding a height increasing area having a designated height to the bottom of the soft keyboard area of the original input method window to form the target, and changing the layout of the original input method window corresponding to the input method application includes:

when the application framework layer monitors that the window layout module is initializing the layout of the original input method window of the input method application, intercepting the layout information sent by the window layout module to the window display module through the Hook mechanism, and adjusting the layout information by adding a height increasing area having a designated height to the bottom of the soft keyboard area of the original input method window to form the target, and sending the adjusted layout information to the window display module, to display the target input method window in the changed layout.

In this example, a target input method window including a height increasing area is displayed, so that when the user inputs content through the input method, the touch range of the finger and the grip feeling of the terminal device are made more comfortable and ergonomic, thereby providing a comfortable input experience. Also, various input method applications can be supported.

In some examples, the Hook mechanism in the application framework layer is used to change the layout of the current input method application from a system level perspective. Hook can be translated into hooks that can incorporate their own codes into the process of a hooked program and become part of the target process. In the example of the present disclosure, when the layout of the input method application is being initialized, the Hook mechanism can be used to intercept the layout information sent by the window layout module (such as the function module formed by the window layout function) to the window display module (such as the function module formed by the window display function), adjust the layout information by adding a height increasing area having a designated height to the bottom of the soft keyboard area of the original input method window to form the target, and send the adjusted layout information to the window display module, to display a target input method winding having a height increasing area. In this way, when the user inputs content through the input method, the touch range of the finger and the grip feeling of the terminal device are made more comfortable and ergonomic, thereby providing a comfortable input experience. Also, a layout of various input methods is given an uniform adaption.

Examples of the present disclosure may be applied to various operating systems such as an Android system, an IOS system, and the like. Taking the Android system as an example, the Android system may include an application layer and an application framework layer, and other layers will not be discussed in the present disclosure. The Framework in Android is a layer under the direct application and called the application framework layer. This layer is the API (Application Interface) framework used by the core application, provides various APIs for the application layer and provides various components and services to support Android development, including ActivityManager, WindowManager, and ViewSystem.

In the Android system, the application corresponding to the input method needs to inherit the input method service InputMethodService, and the window layout function (such as initViews) in InputMethodService is used to initialize the input method layout when the input method is started. In the example of the present disclosure, it is possible to intercept, through a Hook mechanism, the layout information sent by the window layout function to the window display function, and adjust the layout information by adding a height increasing area having a designated height to the bottom of the soft keyboard area of the original input method window to form the target. For example, in the Application Framework layer, the Hook mechanism is used to add codes to the initViews method of the InputMethodService to modify the layout and thus a height increasing area is added. Taking FIG. 1 as an example, the codes added through the Hook mechanism can be executed in the process of the input method, thereby modifying the input method layout.

For how to add a height increasing area having a designated height, in an example, the process of obtaining the height increasing area may include:

obtaining the designated height; and if the original input method window includes a blank layout area and a soft keyboard area, by adjusting the height of the blank layout area, adding a height increasing area having a designated height to the bottom of the soft keyboard area of the original input method window, the blank layout area being an area between the top of the soft keyboard area and the top of the screen.

In this example, by adjusting the height of the blank layout area, a height increasing area having a designated height is added to the bottom of the soft keyboard area of the original input method window, thereby improving the modification efficiency.

Figure 2C:
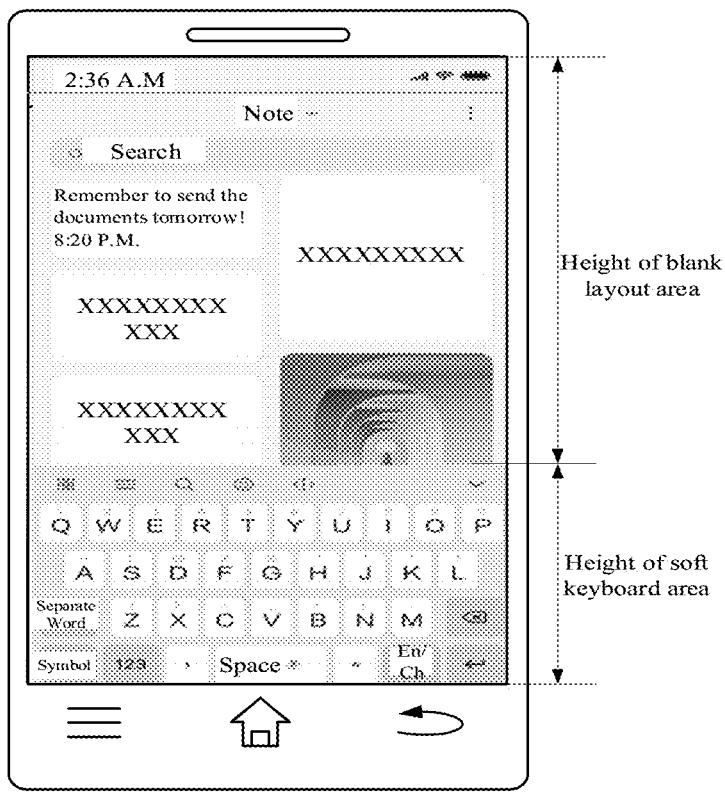
FIG. 2C is a schematic diagram illustrating a height of a blank layout area and a height of a soft keyboard area in the related art.

Still taking the Android system as an example, in some scenarios, the original input method layout includes a blank layout area (such as FullScreenArea) and a soft keyboard area (such as InputArea). As shown in FIG. 2C, it is a schematic diagram illustrating a height of a blank layout area and a height of a soft keyboard area in the related art. In the full screen mode, the sum of the height of the blank layout area and the height of the soft keyboard area may be equal to the height of the screen, and the blank layout area does not affect the display and touch operations of the lower window by the user. The lower window is a window of an application (such as the note application in FIG. 2C) that uses the input method application. The heights of the blank layout area and the soft keyboard area can be obtained and dynamically adjusted. In this example, the heights of the FullScreenArea and the InputArea can be reset according to the required height of the height increasing area, so that the height increasing area can be normally displayed.

It should be understood that other means may be used to obtain the height increasing area, which will not be elaborated one by one herein.

Regarding the designated height of the height increasing area, in an example, the designated height of the height increasing area may be preset, and the soft keyboard area of this height is suitable for manipulation by the user. Further, for different screen sizes, corresponding preset heights for comfort manipulation may be different. In this regard, a mapping relationship between designated heights and screen sizes is determined in advance, and the designated height may be determined based on the screen size of the smart terminal. For example, a designated height for a terminal device having a relatively large screen size may be larger than a designated height for a terminal device having a relatively small screen size. In actual applications, the lower margins of different smart terminals may be different. For example, there are differences in the lower margins of the terminal device s between a full-screen terminal device and a non-full-screen terminal device. The lower margin of the terminal device is the distance between the lower edge of displaying area of the screen and the lower bezel of the body in the smart terminal. In this regard, in another example, a correspondence between a type of the smart terminal and a designated height is pre-configured, and the designated height is determined based on the type of the smart terminal and the correspondence.

However, in practice, as an increasing number of smart terminals are available, it is difficult to list the smart terminals one by one. In this regard, in another example, the designated height may be determined based on the preset manipulation height and the lower margin of the terminal device. The preset manipulation height is a distance between the bottom of the preset soft keyboard area and the lower bezel of the device body, and the lower margin of the terminal device is a distance between the lower edge of displaying area of the screen and the lower bezel of the body in the smart terminal.

Figure 2D:
FIG. 2D is a schematic diagram illustrating a preset manipulation height and a lower margin of a terminal device according to some embodiments of the present disclosure.

FIG. 2D is a schematic diagram illustrating a preset manipulation height and a lower margin of a terminal device according to an example of the present disclosure. As shown in FIG. 2D, the schematic diagram illustrates the preset manipulation height and the lower margin of a terminal device. For different smart terminals, the preset manipulation height can be the same or different. In some embodiments, the preset manipulation height may be determined based on the body height/body size of the smart terminal. The lower margin of the terminal device can be determined according to the size of the body and the size of the screen.

For different smart terminals having the same preset manipulation height, the height increasing area can be dynamically adjusted according to the lower margin of the terminal device. The height of the height increasing area on a terminal device with a smaller lower margin is relatively large; and the height of the height increasing area on a terminal device with a larger lower margin is relatively small. It is to ensure that the distance between the lower bezel of the terminal body and the input area of the input method is the same, to achieve a uniform style. For different terminal devices having large differences in body heights, different smart terminals may have different preset manipulation heights.

For example, codes can be added to the Hook mechanism to implement: calculating a height of the height increasing area to be displayed according to the lower margin of the terminal device, and after the height is calculated, determining the display space for the height increasing area by adjusting the height of the blank layout area (fullscreenArea) of the input method.

In order to make the height increasing area more useful, such as, to provide more shortcut functions for the user, in another example, the height increasing area includes a designated shortcut button set, and the designated shortcut button set includes one or more shortcut buttons, for example, shortcut buttons associated with the input. The designated shortcut button can be a shortcut control that provides designated functionality. The designated shortcut button may be a previously designated fixed shortcut button, or may be a shortcut button according to the frequency used by the user or set by the user. For example, the designated shortcut button may include, but not limited to, a voice input button, a clipboard button, a common language button, an input method switching button, an input method setting button, and the like, in particular, a shortcut button for improving input efficiency. The number of designated shortcut buttons can be pre-configured.

Still taking the Android system as an example, codes can be added to the Hook mechanism to implement: while adding the height increasing area, adding the designated shortcut button to the height increasing area, such as two buttons: an input method switching button and a clipboard button. After the input method switching button is clicked on, a window is popped out for the user to select the input method. After the clipboard button is clicked on, a window listing all or part of the contents of the user's clipboard is popped out for the user to select, paste, and input.

The instruction to display the input method window can be obtained when the input area is triggered. The input area may be an area where data is to be input, and may include an input box, a text box, text to be edited, or the like. The target input method window can be displayed while the input area is in an input-able state. Whether the input area is in an input-able state can be triggered by a user operation. For example, the user triggers the input area to be input-able by clicking on the input area. The clicked position in the input area may be referred to as a target position or a focus position, and the clicked position may be a position where the cursor is located, and the user is prompted to locate the target position/focus position by displaying the cursor. The target position/focus position may be the position at which data is to be input. When the target input method window is displayed, a floating window containing data to be pasted may be displayed at a designated position of the target input method window, and the data to be pasted is data newly added to the clipboard. When the paste instruction is triggered based on the operation of the floating window, the paste instruction is responded to.

In some embodiments, a condition for displaying the floating window may be further defined. For example, the condition for displaying the floating window further includes that a copy operation and/or a cut operation has been performed before the target input method window is displayed, which can be specifically configured as desired.

The clipboard is used to temporarily store copied data and/or cut data, which can be called a data transfer station, a temporary storage area or a temporary storage database. The clipboard temporarily stores at least the lastly copied data and/or the lastly cut data, that is, the data newly added to the clipboard, and the data can be referred to as data to be pasted.

The data to be pasted is displayed in a floating window to remind the user that the paste operation can be implemented based on the floating window. The floating window can display all or part of the data to be pasted, and can be configured as desired. For example, all or part of the data to be pasted is displayed by default. For example, all or part of the data to be pasted is displayed as set by the user. Whether all or part of the data to be pasted is displayed in the floating window can also be determined by the amount of data to be pasted and the size of the floating window. The floating window can be on the interface where the input area is located.

Figure 3A:
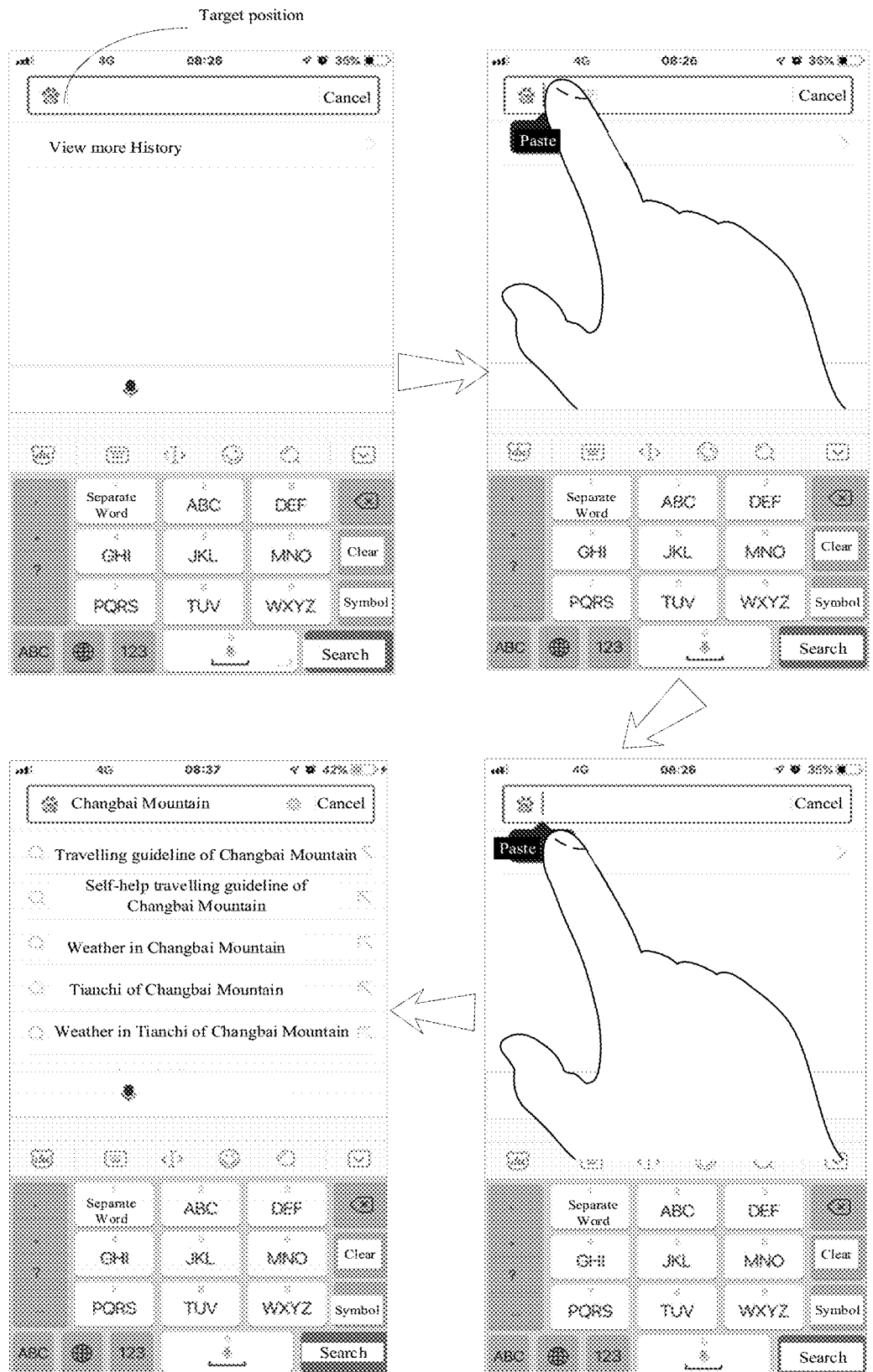
FIG. 3A is a schematic diagram of a paste process in the related art.

Existing mobile terminals, such as mobile phones, tablets, or PCs, generally provide copy and paste functions. For example, as shown in FIG. 3A, it is a schematic diagram of a pasting process in the related art. First the data to be pasted is copied or cut in one place, then a page where the data is to be pasted is entered. After long pressing the target position in the input box of the page, the "Paste" button will appear. By clicking on the "Paste" button, the data to be pasted is obtained from the clipboard and pasted to the target position of the input area. It can be seen that after entering the page to which the data is to be pasted, multiple steps are required to implement data pasting, which involves a plurality of pasting steps for pasting, and has a relatively low pasting efficiency.

In this regard, the examples of the present disclosure provide a solution that can reduce the number of pasting steps and allow repeated pasting. The present disclosure may be pre-configured with a repeated paste state, and further, may be configured with a single paste state. When the current paste state is the repeated paste state, the data to be pasted is pasted into the input area by triggering the floating window, which can reduce the number of pasting steps and improve the pasting efficiency. Moreover, the data to be pasted can be repeatedly pasted by retaining the display of the floating window.

Regarding the repeated paste state, the repeated paste state is a state in which the same data to be pasted is allowed to repeatedly paste. In the repeated paste state, the same content can be pasted for multiple times, which can simplify the repeated pasting steps without repeatedly performing copy and paste by the user.

In some application scenarios, retaining the floating window in the repeated paste state may cause interference to the user. For this reason, a condition for closing the floating window may also be set, and the floating window is closed when the preset closing condition is satisfied. For example, the preset closing condition may include triggering a close instruction based on an operation on the floating window when the current paste state is the repeated paste state. For another example, the preset closing condition may include: when the current paste state is the repeated paste state, a preset delay time period from the data to be pasted which is pasted to the input area is expired. It should be understood that the above-mentioned preset closing conditions are merely examples, and should not be construed as any limitations of the present disclosure. Other existing or future active triggering or delay triggering conditions for closing the floating window may be applied to the present disclosure and thus are included in the scope of protection of the present disclosure.

In this regard, in some embodiments, the single paste state may be referred to as a close-after-paste state, and the repeated paste state may include a delayed-close-after-paste state and a retain-after-paste state. In the single paste state, the same content is only allowed to be pasted once, and then the floating window is closed.

Correspondingly, the pre-configured paste state includes one or more of the following: a close-after-paste state, a delayed-close-after-paste state and a retain-after-paste state. The response paste instruction may include:

when a current paste state is the close-after-paste state, performing operation of pasting the data to be pasted and closing the floating window;

when the current paste state is the delayed-close-after-paste state, performing operation of pasting the data to be pasted and closing the floating window after a preset time period of delay, where the preset time period can be set as desired, for example, set to 5 minutes, 2 minutes, and the like; or when the current paste state is the retain-after-paste state, performing operation of pasting the data to be pasted and retaining display of the floating window.

The paste instruction can be triggered multiple times during the display of the floating window.

For the retain-after-paste state, the floating window may be closed through a close control on the floating window, or the floating window may be closed when the target input method window is closed. For example, the floating window can include a close control, and a close instruction is triggered by clicking on the close control. As shown in the first image in FIG. 3B, the close control can be an "X" control, and the "X" control can be clicked to close the floating window. When the user needs to paste again, the user can find the corresponding data by clicking the clipboard shortcut.

The floating windows can be the same or different in different paste states. For example, in order to distinguish, in the close-after-paste state, the floating window is referred to as a first floating window (or single pasting floating window); in a delayed-close-after-paste state, the floating window is referred to as a second floating window; and in the retain-after-paste state, the floating window is referred to as a third floating window. When the content to be pasted is the same, the first floating window, the second floating window, and the third floating window may be the same or may be different. The different floating windows are used to remind the user that the current paste state is the close-after-paste state, the delayed-close-after-paste state or the retain-after-paste state. For example, in order to remind the user that the current paste state is the close-after-paste state or the retain-after-paste state, the first floating window and the third floating window may be set to be different. For example, the first floating window does not include a close control, and the third floating window includes a close control. As shown in FIG. 3B, it is a schematic diagram showing a comparison of a first floating window and a third floating window according to some embodiments of the present disclosure. The user can distinguish whether the current paste state is the close-after-paste state or the retain-after-past state by determining whether there is a close control (such as the "X" control).

Examples of the present disclosure also provide a paste-state setting service. In some embodiments, the paste-state setting service can be implemented by a paste-state setting interface under a designated path. For example, in the setting application of the smart terminal, the corresponding paste-state setting interface can be found according to the designated path, and the current paste state is set based on the paste-state setting interface.

In some scenarios, the user may be recalled to set the paste state after copying. In order to improve the setting efficiency, in some embodiments, the method further includes: performing switching operation between paste states when a designated sliding event is detected based on the interface where the target input method window is located. For example, when the paste state includes a single paste state and a repeated paste state, in a case that the designated sliding event is detected, if the current paste state is a single paste state, the single paste state is switched to the repeated paste state; and if the current paste state is the repeated paste state, the repeated paste state is switched to a single paste state. For another example, in the case where the paste state includes a close-after-paste state, a delayed-close-after-paste state, and a retain-after-paste state, the current paste state can be switched to the next paste state in a preset order when the designated sliding event is detected. The sliding event can be an event that slides on a designated trajectory. For example, the event that slides on a designated trajectory may be sliding to the left, sliding to the right, drawing a designated figure, and the like. In this example, based on the designated sliding event detected on the interface where the input area is located, switching between paste states is implemented, thereby realizing fast switching.

In another example, the method further includes: switching to a designated paste state when a designated sliding event is detected based on the interface where the input area is located. In this example, regardless of the current paste state, when the designated sliding event is detected, the current paste state can be directly switched to the designated paste state, so as to achieve fast switching to the designated paste state. The designated paste state may be a single paste state or a repeated paste state, or may be a close-after-paste state, a delayed-close-paste state, or a retain-after-paste state, which may be set by the user.

In other examples, after the input area is triggered into the input-able state, the data to be pasted is automatically pasted, and the user does not need to manually perform paste, thereby further improving the paste efficiency.

Regarding the designated position, the designated position may be a pre-configured position suitable for displaying the floating window. In some embodiments, the designated position may be a position associated with a cursor position in the input area. For example, the designated position may be a position adjacent to the cursor position in the input area so that the user can quickly paste the data by clicking on the floating window. As shown in FIG. 3C, in the schematic diagram, after the user copies the data to be pasted in other positions (assumed to be "chi mei wang liang"), the user can enter the Baidu application homepage, and click the input box to make the input box in an input-able state. At this time, the floating window can be displayed at a position adjacent to the position where the cursor of the input box is located, and the floating window contains data to be pasted to remind the user that the data to be pasted can be pasted. For example, the user can click on the floating window to paste the data to be pasted ("chi mei wang liang") into the input box.

In another example, the designated position is a position associated with an input method keyboard. For example, the position associated with an input method keyboard may be a position adjacent to the input method keyboard, or may be on an input method keyboard or the like. The input method application may be a software in which one or more input modes such as voice, handwriting, pinyin, strokes, and double spelling are integrated. The input method keyboard can be a soft keyboard provided by the input method application for the user to input data. The input method keyboard may include a keyboard of various input modes such as Pinyin 9 key, Pinyin 26 key, Wubi 9 key, Wubi 26 key, stroke keyboard, handwriting keyboard, voice keyboard, and the like. When the input area is triggered to be input-able, the input method can be invoked and the input method keyboard can be displayed. For example, the floating window is displayed in the area directly adjacent to the input method keyboard, or in the case of displaying the input method keyboard, the clipboard shortcut control is displayed in the area associated with the input method keyboard, the designated position is the position adjacent to the clipboard shortcut control, and the floating window is displayed near the clipboard shortcut control.

In this example, displaying the clipboard shortcut control in an area adjacent to the input method keyboard can realize the visualization of the clipboard. Moreover, the floating window is displayed near the clipboard shortcut control. Since the floating window remains displayed after the paste instruction is triggered in the repeated paste state, displaying the floating window near the clipboard shortcut control can avoid interference to inputting other data by the user, compared with a case that the floating window is always displayed near the input area.

In practical applications, the input method is one of the most commonly used tools for users when using smart terminals. Using input methods to type text content is the most common operation for users. In a full-screen mobile phone terminal, the input method designed in above examples is aimed to reduce false touch in typing on the mobile phone, and is ergonomic, so that the grip feeling and the touch feeling in typing are more comfortable. In addition, the height increasing area is arranged under the input method keyboard to raise the soft keyboard area to a proper height. In order to make the blank area at the bottom of the keyboard more useful, to provide more shortcut and convenient functions for the user, a clipboard shortcut control is arranged in the height increasing area. Of course, other controls can be arranged as desired, such as, one or more designated shortcut buttons selected from a voice input button, a common language button, an input method switching button, an input method setting button, and the like.

In this regard, in another example, the height increasing area includes a clipboard shortcut control, and the designated position is a position adjacent to the clipboard shortcut control. As shown in FIG. 3B, the data to be pasted can be displayed near the clipboard shortcut control in the height increasing area. In this example, by displaying a clipboard shortcut control in the height increasing area below the input method keyboard, and displaying the floating window at a position adjacent to the clipboard shortcut control, it not only can raise the soft keyboard area to a proper height to make more comfortable grip feeling and touch feeling for the user in typing, but also can avoid interference to the user caused by not exiting from the floating window.

Taking the Hook mechanism to change the layout as an example, codes can be added to the Hook mechanism to further implement: while adding the height increasing area, adding a clipboard shortcut control in the height increasing area. An instruction to display the input method window is acquired, a target input method window is displayed and a floating window containing data to be pasted is displayed at a designated position of the target input method window. Further, upon clicking on the clipboard, a window can be popped out to list all or part of the contents of the user's clipboard, for the user to select and paste the input. It can be understood that other shortcut controls related to the input can be added to the height increasing area.

When the target input method window is displayed, if the terminal device is currently in the paste state, for example, there is copied data and/or cut data currently, a floating window containing data to be pasted is displayed at a position adjacent to the clipboard shortcut control, and the user can trigger a paste instruction by operating on the floating window, thereby to paste the data to be pasted into the input area, which can reduce the number of paste operation steps, improve the paste efficiency, and at the same time, the data to be pasted is repeatedly pasted or single pasted by retaining or not retaining the display of the floating window in different past states.

In some scenarios, the clipboard not only temporarily stores the newly added data, but also temporarily stores the data added in history. The validity period of the data in the clipboard can be configured as desired. For example, the data in the clipboard is deleted after the temporary storage time reaches the designated time. For example, after restarting the operating system, all data of the clipboard cache is cleared off. For example, only a preset number of data is allowed to be temporarily stored in the clipboard. The user may have a need to paste previously copied data. In this regard, in some embodiments, the method further includes: when the clipboard shortcut control is triggered, displaying multiple pieces of data cached in the clipboard in chronological order of the data being added to the clipboard.

Figure 3D:
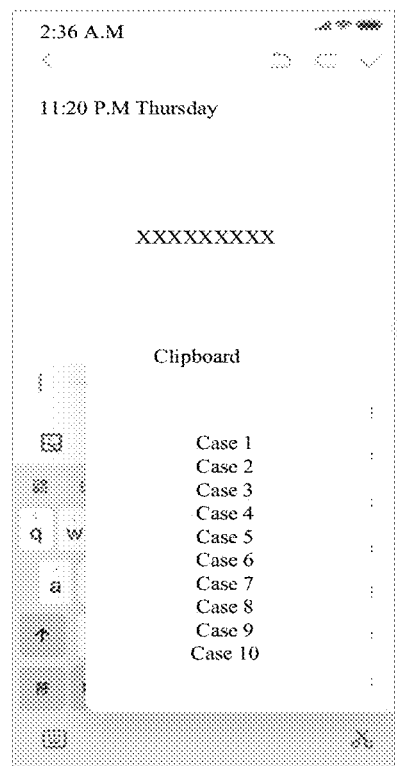
FIG. 3D is a schematic diagram of an interface after a clipboard shortcut control is triggered according to some embodiments of the present disclosure.

Multiple pieces of data cached in the clipboard can be displayed at a position adjacent to the clipboard shortcut control, or can be displayed in other page that can be jumped to. As shown in FIG. 3D, it is a schematic diagram of an interface after a clipboard shortcut control is triggered according to some embodiments of the present disclosure. In the schematic diagram, the content displayed upon clicking on the clipboard shortcut control is illustrated, and the data copied in history can be sorted according to the copy time. The user can click on one piece of the data copied in history to quickly paste the copied content.

In this example, the user can click on the clipboard shortcut control to display multiple piece of data cached in the clipboard at a position adjacent to the clipboard shortcut control, and data copied in history can be quickly pasted by selecting a piece of data for paste.

It can be understood that the designated position can also be other positions. For example, the floating window can be displayed in the middle or other position of the screen to remind the user to paste, and so on, which will not be elaborated one by one herein.

Regarding the data to be pasted, the data may be data newly added to the clipboard, that is, data added to the clipboard most recently from the current time, and the data of the last copy operation and/or cut operation, which may be defined as copied data in a generalized concept. In this example, it is considered that the data recently added to the clipboard is the data that the user desires to paste.

The data to be pasted may be data of a type such as text data, links, pictures, and the like. In some embodiments, when it is detected that the data to be pasted is plain text data or non-link data, the paste instruction is triggered by clicking on the floating window, so as to implement a case in which upon clicking on the floating window, a paste instruction may be triggered, and the data to be pasted is pasted to the input area. The plain data refers to that all of the data to be pasted is text.

In actual applications, there may be cases where in some applications, a link cannot be directly opened. For example, a link cannot be opened in a note. In this case, the link has to be copied to a browser to access the link, and the operation steps are cumbersome. In this regard, in some embodiments, when the user copies the link, it may be determined that the user has the need to access the page indicated by the link, and the method further includes: when the data to be pasted is link data, and an access instruction is triggered based on operation on the floating window, displaying the page indicated by the data of the link.

In this example, the user can operate on the floating window to trigger an access instruction, thereby enabling quick access to the page indicated by the link, and avoiding the defect that in some applications, it is inefficient in accessing a webpage since the link cannot be directly opened. Regarding the access instruction, in some embodiments, the access instruction can be triggered by the user clicking on the floating window. This example achieves quick access to the page indicated by the link by directly clicking on the floating window. In some scenarios, there may be a need to copy a link, in this regard, in another example, the floating window includes an access control, and an access instruction is triggered by the user clicking on the access control on the floating window. Regarding the paste instruction, in some embodiments, the user can click positions on the floating window other than the access control to trigger the paste instruction. In another example, the floating window further includes a paste control, and the paste instruction is triggered by the user clicking on the paste control in the floating window. By distinguishing between the access control and the paste control, it is possible to access a page corresponding to a link, or to implement the paste of a link.

Figure 3E:
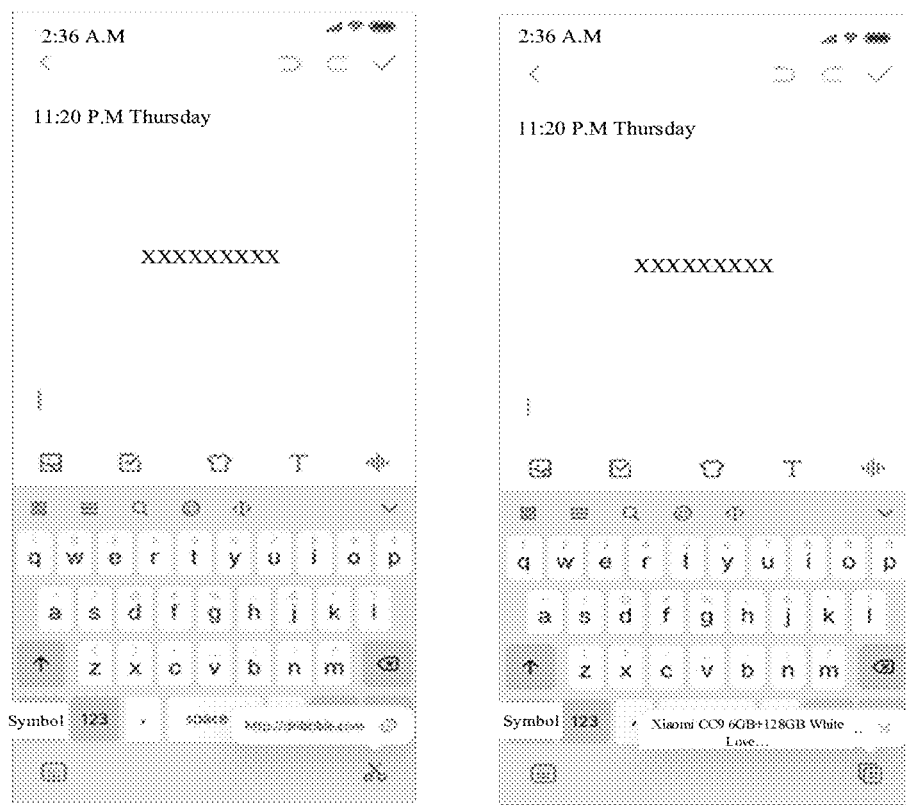
FIG. 3E is a schematic diagram showing a comparison of clipboard shortcut controls when the data to be pasted is different according to some embodiments of the present disclosure.

Further, in order to distinguish that the data to be pasted is only a link and a non-plain link, different icons may be used to display the clipboard shortcut control. Non-plain link refers to that the data to be pasted includes a link and text. Plain link refers to that all of the data to be pasted is a link. As shown in FIG. 3E, in the left figure, when the data to be pasted is a plain link, an icon of scissors is used to represent the clipboard shortcut control. In the right figure shown in FIG. 3E, when the data to be pasted is a text, an icon of paste is used to indicate the clipboard shortcut control. Different icons can be used to distinguish the operations that may be triggered by clicking on the floating window. When the floating window in the left figure is clicked, the page corresponding to the link is directly accessed, for example, the page corresponding to the link is opened by a designated application. When the floating window in the right figure is clicked, the data to be pasted is copied to the input area of the current interface.

The various technical features in the above examples may be arbitrarily combined, as long as there is no conflict or contradiction between the combinations of the features, which will not be described one by one for brevity. Therefore, any combination of various technical features in the above embodiments is also within the scope of the present disclosure.

The following is an example of one of the combinations.

Figure 4:
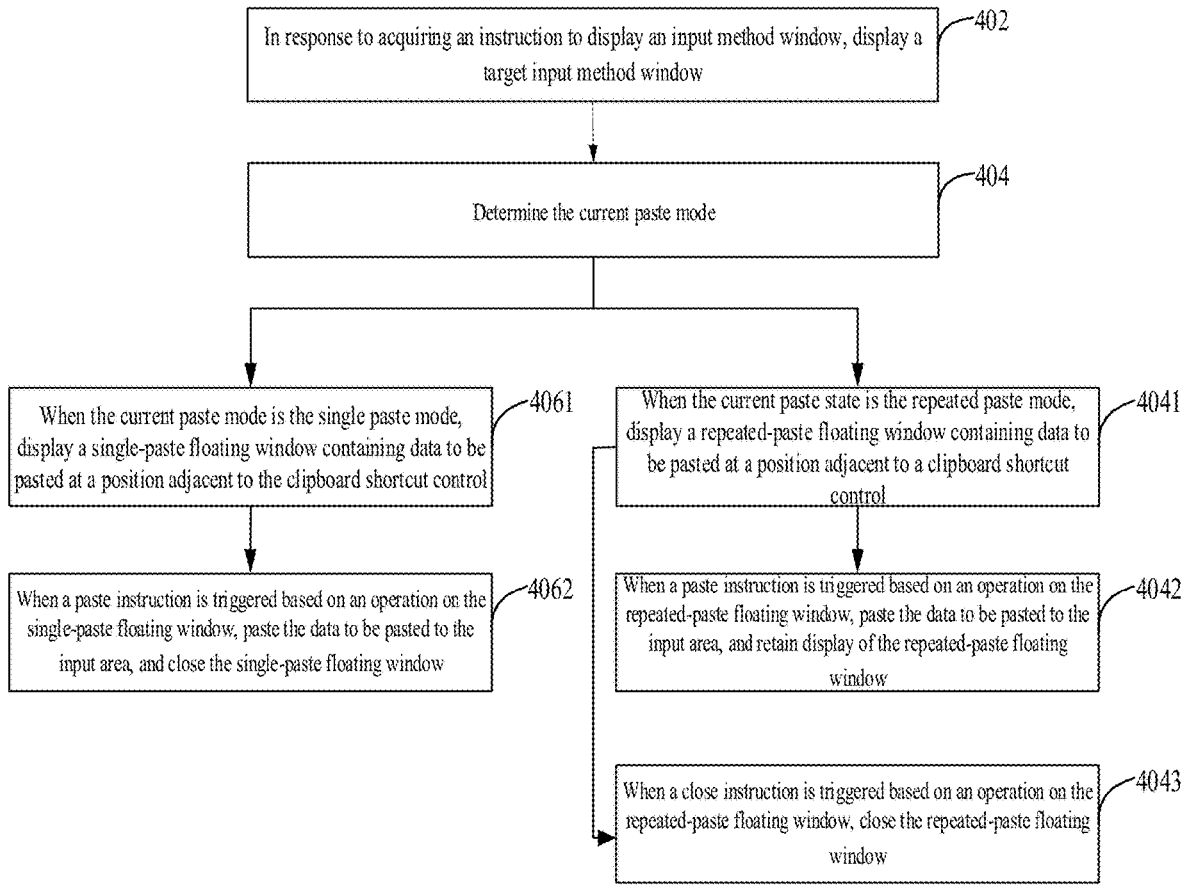
FIG. 4 is a flowchart of another method of processing data according to some embodiments of the present disclosure.

As shown in FIG. 4, it is a flowchart of another method of processing data according to some embodiments of the present disclosure, a repeated paste mode and a single paste mode are pre-configured. The repeated paste state may be a state in the repeated paste mode, and the single paste state may be a state in the single paste mode. The method can include the following steps.

At step 402, in response to acquiring an instruction to display an input method window, a target input method window is displayed. The target input method window includes a soft keyboard area and a height increasing area, and the height increasing area is located at the bottom of the soft keyboard area, and is configured to raise the soft keyboard area.

At step 404, the current paste mode is determined. In some embodiments, the repeated paste mode may include a delayed-close-after-paste sub-mode and/or a retain-after-paste sub-mode, and the following is illustrated by the repeated paste mode being the retain-after-paste sub-mode as an example.

At step 4041, when the current paste state is the repeated paste mode, a repeated-paste floating window containing data to be pasted is displayed at a position adjacent to a clipboard shortcut control.

The data to be pasted is data newly added to the clipboard; and the clipboard shortcut control is displayed in the height increasing area.

At step 4042, when a paste instruction is triggered based on an operation on the repeated-paste floating window, the data to be pasted is pasted to the input area, and display of the repeated-paste floating window is retained. Triggering a paste instruction based on an operation on the repeated-paste floating window may include detecting a paste instruction being triggered based on the repeated-paste floating window.

At step 4043, when a close instruction is triggered based on an operation on the repeated-paste floating window, the repeated-paste floating window is closed. Triggering a close instruction based on an operation on the repeated-paste floating window may include detecting a close instruction being triggered based on the repeated-paste floating window.

At step 4061, when the current paste mode is the single paste mode, a single-paste floating window containing data to be pasted is displayed at a position adjacent to the clipboard shortcut control.

At step 4062, when a paste instruction is triggered based on an operation on the single-paste floating window, the data to be pasted is pasted to the input area, and the single-paste floating window is closed. Triggering a paste instruction based on an operation on the repeated-paste floating window may include detecting a paste instruction being triggered based on the single-paste floating window.

In this example, in the single paste mode, the copied content is closed after clicking paste. In the repeated paste mode, the copied content is retained after clicking paste. The repeated-paste floating window and single-paste floating window can be displayed in the form of bubbles. When the content copied by the user is plain text, the repeated-paste floating window or single-paste floating window is clicked to directly paste the content into the input area, such as input focus area. When the content copied by the user is a link, the repeated-paste floating window or single-paste floating window is clicked to directly open the web page corresponding to the link.

After copying the content in one place, the user enters the page to which the content is to be pasted, and the input method keyboard is invoked. A bubble appears automatically above the clipboard function control in the blank area at the bottom of the input method keyboard. The content just being copied is in the bubble. The copied content will be pasted into the input focus area when being clicked on. If the user sets "click to paste and close the copied content" (single paste), the bubble disappears; and if the user sets "click to paste and then retain the content" (repeated paste), the bubble does not disappear. The user clicks on the close button on the bubble and the bubble disappears. If in the bubble is content of a link, after the bubble is clicked on, a browser will be directly opened to access the page pointed by the link Further, a database can also be used to record the contents of the clipboard. By monitoring whether the contents of the clipboard are changed in the system, when new content is added into the clipboard, the content is written into the database, thereby realizing the ability of storing multiple pieces of copied records. When there is a need to view the copied data in history, the data can be viewed by clicking on the clipboard shortcut control.

In the example, the copied content can be quickly pasted with only one step, the process is extremely short, and very convenient. The copied content can be repeatedly pasted, which is quick and easy. The copied link address can be quickly accessed with only one step, which is quick and convenient.

Corresponding to the above examples of the method of processing data, the present disclosure also provides an example of an apparatus of processing data, a device to which the apparatus is applied, and a storage medium.

Figure 5:
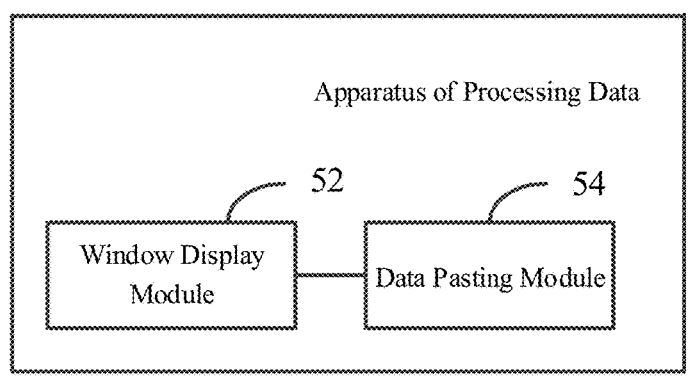
FIG. 5 is a block diagram of an apparatus of processing data according to some embodiments of the present disclosure.

As shown in FIG. 5, it is a block diagram of an apparatus of processing data according to some embodiments of the present disclosure, the apparatus includes a window display module 52 and a data pasting module 54.

The window display module 52 is configured to, in response to acquiring an instruction to display an input method window, display a target input method window, and display a floating window containing data to be pasted at a designated position of the target input method window; wherein the target input method window includes a soft keyboard area and a height increasing area, the height increasing area is located at the bottom of the soft keyboard area, and is configured to raise the soft keyboard area; the data to be pasted is data newly added to the clipboard; and The data pasting module 54 is configured to, when a paste instruction is triggered based on an operation on the floating window, respond to the paste instruction.

In some embodiments, the pre-configured paste state includes one or more of the following: a close-after-paste state, a delayed close-after-paste state, and a retain-after-paste state.

Responding to the paste instruction includes one or more of the following situations:

if a current paste state is the close-after-paste state, performing operation of pasting the data to be pasted and closing the floating window;

if the current paste state is the delayed-close-after-paste state, performing operation of pasting the data to be pasted and closing the floating window after a preset time period of delay is expired; and if the current paste state is the retain-after-paste state, performing operation of pasting the data to be pasted and retaining display of the floating window.

The paste instruction can be triggered for multiple times during the display of the floating window.

In some embodiments, the apparatus further includes a state switching module configured to, when a designated sliding event is detected based on an interface where the target input method window is located, perform a switching operation between the paste states or switch to a designated paste state.

In some embodiments, the apparatus further includes a page access module configured to, when the data to be pasted is link data, and an access instruction is triggered based on an operation on the floating window, display a page indicated by the link data.

The access instruction is triggered by a user clicking the floating window. The access instruction is triggered by a user clicking an access control on the floating window, and the paste instruction is triggered by a user clicking on a paste control on the floating window.

In some embodiments, the height increasing area includes a clipboard shortcut control therein, and the designated position is a position adjacent to the clipboard shortcut control.

In some embodiments, the window display module 52 is further configured to when the clipboard shortcut is triggered, display multiple pieces of data cached in a clipboard in chronological order of the data being added to the clipboard.

In some embodiments, the target input method window is an input method window corresponding to an input method application, or the target input method window is based on and acquired by adding a height increasing area having a designated height to the bottom of the soft keyboard area of an original input method window to form a target, and changing a layout of the original input method window corresponding to the input method application.

In some embodiments, the apparatus further includes a layout changing module configured to when an application framework layer monitors that a window layout module is initializing the layout of the original input method window of the input method application, intercept layout information sent by the window layout module to a window display module through a Hook mechanism, and adjust the layout information by adding a height increasing area having the designated height to the bottom of the soft keyboard area of the original input method window to form the target, and send the adjusted layout information to the window display module, to display the target input method window in the changed layout.

In some embodiments, the apparatus is applied to a smart terminal, and the designated height is determined based on a preset manipulation height and a lower margin of the terminal device, wherein the preset manipulation height is a preset distance between the bottom of the soft keyboard area and a lower bezel of the body, and the lower margin of the terminal device is a distance between the lower edge of displaying area of the screen and the lower bezel of the body in the smart terminal device.

Accordingly, the present disclosure also provides an electronic device. The device includes a processor; and a memory storing processor-executable instructions; wherein the processor is configured to perform the steps of the method of any of the above.

Accordingly, the present disclosure also provides a computer readable storage medium storing a computer program that, when executing the computer program, a processor is caused to perform the steps of any of the methods described above.

The present disclosure may take the form of a computer program product embodied on one or more storage media (including but not limited to disk storage, CD-ROM, optical storage, etc.) in which program codes are embodied. The computer-usable storage medium includes both transitory and non-transitory, removable and non-removable media, and information storage can be implemented by any method or technology. The information can be computer readable instructions, data structures, modules of programs, or other data. Examples of computer storage medium include, but not limited to, a phase change memory (PRAM), a static random access memory (SRAM), a dynamic random access memory (DRAM), other type of random access memory (RAM), a read only memory (ROM), an electrically erasable programmable read only memory (EEPROM), a flash memory or other memory technology, a compact disk read only memory (CD-ROM), a digital versatile disk (DVD) or other optical storage, a magnetic tape cartridge, a magnetic tape storage or other magnetic storage device or any other non-transportable media that can be used to store information that can be accessed by a computing device.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

For details of the implementation process of the functions and effects of the modules in the above apparatus, reference can be made to the implementation process of the corresponding steps in the above methods, details of which will not be described herein again.

For the device example, since it basically corresponds to the method example, reference may be made to the partial description of the method example. The device examples described above are merely illustrative, wherein the modules described as separate components may or may not be physically separate, and the components displayed as modules may or may not be physical modules, that is, may be located at one place, or can be distributed to multiple network modules. Some or all of the modules may be selected according to actual needs to achieve the objectives of the present disclosure. It can be understood and implemented by those of ordinary skill in the art without any creative effort.

Figure 6:
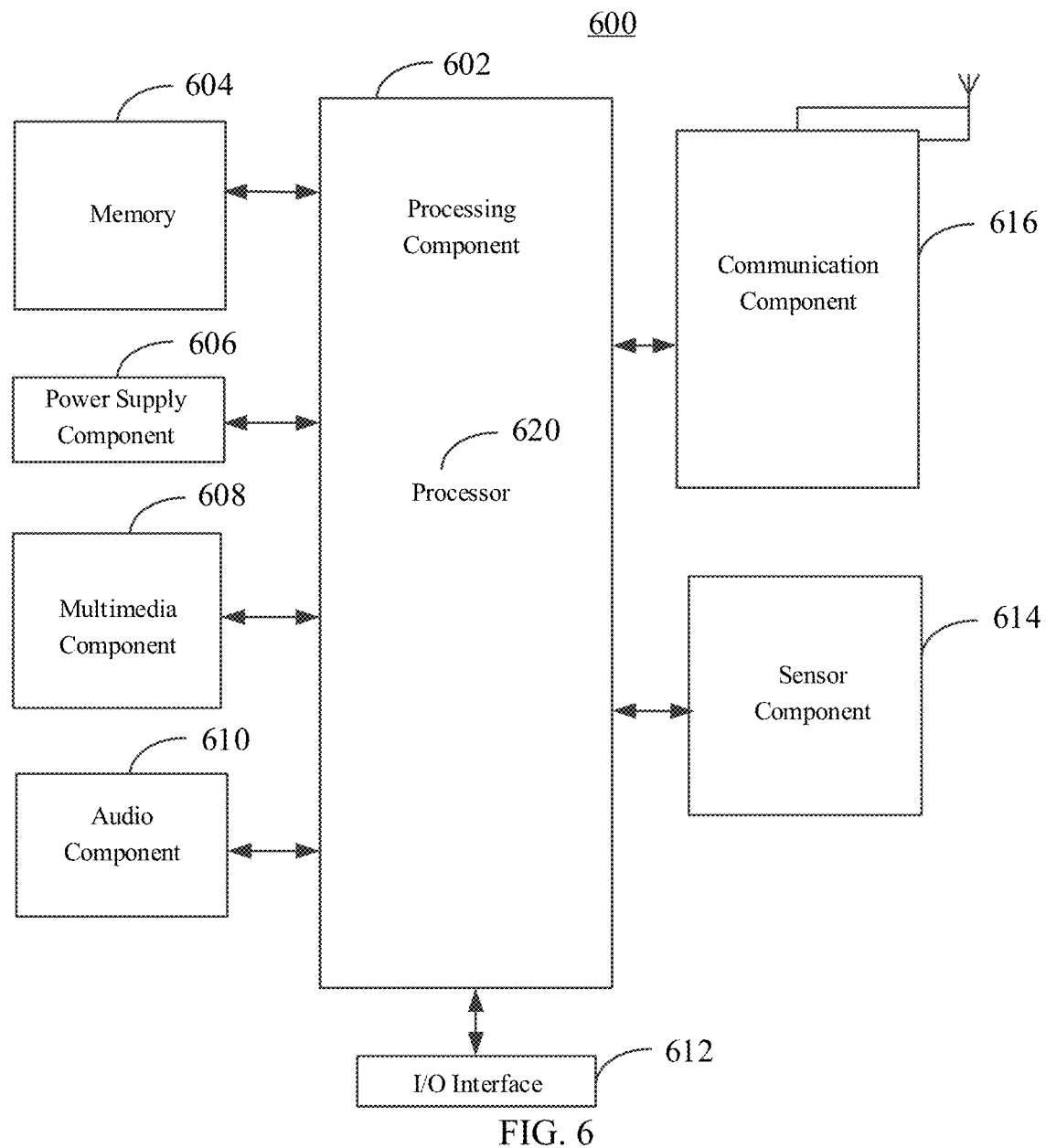
FIG. 6 is a block diagram of an apparatus of processing data according to some embodiments of the present disclosure.

As shown in FIG. 6, it is a block diagram of an apparatus of processing data according to some embodiments of the present disclosure. For example, the apparatus 600 may include a terminal device such as a mobile phone, a computer, a digital broadcast terminal, a messaging device, a game console, a tablet device, a medical device, a fitness device, a personal digital assistant, and the like.

As shown in FIG. 6, the apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally controls overall operations of the apparatus 600, such as operations associated with display, phone calls, data communications, camera operations, and recording operations. The processing component 602 may include one or more processors 609 to execute instructions to complete all or part of the steps of the above methods. In addition, the processing component 602 may include one or more modules which facilitate the interaction between the processing component 602 and other components. For example, the processing component 602 may include a multimedia module to facilitate the interaction between the multimedia component 608 and the processing component 602.

The memory 604 is to store various types of data to support the operation on the apparatus 600. Examples of such data include instructions for any application or method operated on the apparatus 600, contact data, telephone directory data, messages, pictures, video and so on. The memory 604 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 606 supplies power for different components of the apparatus 600. The power supply component 606 may include a power supply management system, one or more power supplies, and other association components for generating, managing and distributing power for the apparatus 600.

The multimedia component 608 includes a screen providing an output interface between the apparatus 600 and a user. In some examples, the screen may include a Liquid Crystal Display (LCD) and a Touch Panel (TP). In some embodiments, an organic light-emitting diode (OLED) display or other types of displays can be adopted.

If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 608 may include a front camera and/or a rear camera. The front camera and/or rear camera may receive external multimedia data when the apparatus 600 is in an operable mode, such as a photographing mode or a video mode. Each of the front camera and the rear camera may be a fixed optical lens system or have focal length and optical zooming capability.

The audio component 610 is to output and/or input an audio signal. For example, the audio component 610 includes a microphone (MIC). When the apparatus 600 is in an operable mode, such as a call mode, a record mode and a voice recognition mode, the microphone is to receive an external audio signal. The received audio signal may be further stored in the memory 604 or sent via the communication component 616. In some examples, the audio component 610 further includes a speaker for outputting an audio signal.

The I/O interface 612 provides an interface between the processing component 602 and a peripheral interface module. The above peripheral interface module may include a keyboard, a click wheel, buttons, or the like. These buttons may include but not limited to, a home button, a volume button, a start button and a lock button.

The sensor component 614 includes one or more sensors to provide status assessments of various aspects for the apparatus 600. For example, the sensor component 614 may detect the on/off status of the apparatus 600, and relative positioning of component, for example, the component is a display and a keypad of the apparatus 600. The sensor component 614 may also detect a change in position of the apparatus 600 or a component of the apparatus 600, a presence or absence of the contact between a user and the apparatus 600, an orientation or an acceleration/deceleration of the apparatus 600, and a change in temperature of the apparatus 600. The sensor component 614 may include a proximity sensor to detect the presence of a nearby object without any physical contact. The sensor component 614 may further include an optical sensor, such as a Complementary Metal-Oxide-Semiconductor (CMOS) or Charged Coupled Device (CCD) image sensor which is used in imaging applications. In some examples, the sensor component 614 may further include an acceleration sensor, a gyroscope sensor, a magnetic sensor, a pressure sensor, or a temperature sensor.

The communication component 616 is to facilitate wired or wireless communication between the apparatus 600 and other devices. The apparatus 600 may access a wireless network based on a communication standard, such as Wi-Fi, 2G or 3G, 4G, 5G or a combination thereof. In some embodiments, the communication component 616 receives a broadcast signal or broadcast related information from an external broadcast management system via a broadcast channel. In some embodiments, the communication component 616 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In some embodiments, the apparatus 600 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the method as described above.

In some embodiments, there is further provided a non-transitory computer readable storage medium including instructions, such as the memory 604 including instructions. The above instructions may be executed by the processor 620 of the apparatus 600 to complete the above method. For example, the non-transitory computer readable storage medium may be a Read-Only Memory (ROM), a Random-Access Memory (RAM), a CD-ROM, a magnetic tape, a floppy disk, an optical data storage device, and so on.

When instructions in the storage medium are executed by the processor, the apparatus 600 is caused to perform any of the methods of processing data described above.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a standalone program or as a module, component, subroutine, object, or other unit suitable for use in a computing environment.

A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In some embodiments, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of processing data, the method being applied to a smart terminal and comprising:
   in response to acquiring an instruction to display an input method window, displaying a target input method window, wherein the target input method window comprises a soft keyboard area and a height increasing area having a designated height, and the height increasing area is located at a bottom of the soft keyboard area, and is configured to raise the soft keyboard area, the designated height of the height increasing area is determined based on a preset manipulation height and a lower margin of the smart terminal, the preset manipulation height is a preset distance between the bottom of the soft keyboard area and a lower bezel of a body of the smart terminal, and the lower margin of the smart terminal is a distance between a lower edge of displaying area of a screen of the smart terminal and the lower bezel of the body in the smart terminal;
   adding, by changing a layout of an original input method window of an input method application, the height increasing area having the designated height to the bottom of the soft keyboard area of the original input method window to acquire the target input method window;
   automatically displaying a floating window containing data to be pasted at a designated position of the target input method window, wherein the data to be pasted is data newly added to a clipboard; and
   upon a paste instruction being triggered based on an operation on the floating window, responding to the paste instruction.

2. The method according to claim 1, wherein a preconfigured paste state comprises one or more of: a close-after-paste state, a delayed close-after-paste state, and a retain-after-paste state;
   responding to the paste instruction comprises one or more of:
   when a current paste state is the close-after-paste state, performing operation of pasting the data to be pasted and closing the floating window;
   when the current paste state is in the delayed-close-after-paste state, performing operation of pasting the data to be pasted and closing the floating window after a preset time period of delay is expired; or
   when the current paste state is in the retain-after-paste state, performing operation of pasting the data to be pasted and retaining display of the floating window; and
   wherein the paste instruction is capable of being triggered for multiple times during the display of the floating window.

3. The method according to claim 2, wherein the method further comprises:
   when a designated sliding event is detected based on an interface where the target input method window is located, performing a switching operation between the paste states.

4. The method according to claim 2, wherein the method further comprises:
   when a designated sliding event is detected based on an interface where the target input method window is located, switching to a designated paste state.

5. The method according to claim 1, further comprising:
   when the data to be pasted is link data, and an access instruction is triggered based on an operation on the floating window, displaying a page indicated by the link data; wherein the access instruction is triggered by clicking the floating window.

6. The method according to claim 1, further comprising:
   when the data to be pasted is link data, and an access instruction is triggered based on an operation on the floating window, displaying a page indicated by the link data; wherein the access instruction is triggered by clicking an access control on the floating window, and the paste instruction is triggered by clicking on a paste control on the floating window.

7. The method according to claim 1, wherein the height increasing area comprises a clipboard shortcut control, and the designated position is a position adjacent to the clipboard shortcut control.

8. The method according to claim 7, further comprising:
   when the clipboard shortcut control is triggered, displaying multiple pieces of data cached in the clipboard in chronological order of data being added to the clipboard.

9. The method according to claim 1, wherein the target input method window is an input method window corresponding to an input method application.

10. The method according to claim 1, wherein adding, by changing the layout of the original input method window of the input method application, the height increasing area having the designated height to the bottom of the soft keyboard area of the original input method window to acquire the target input method window comprises: when an application framework layer monitors that the layout of the original input method window is being initialized, intercepting original layout information through a Hook mechanism, adjusting the original layout information by adding the height increasing area having the designated height to the bottom of the soft keyboard area of the original input method window, and displaying the target input method window in the adjusted layout information.

11. An electronic device, the electronic device being applied to a smart terminal and comprising:
    a processor; and
    a memory storing processor executable instructions;
    wherein when executing the processor executable instructions, the processor is configured to perform:

in response to acquiring an instruction to display an input method window, displaying a target input method window, wherein the target input method window comprises a soft keyboard area and a height increasing area having a designated height, and the height increasing area is located at a bottom of the soft keyboard area, and is configured to raise the soft keyboard area, the designated height of the height increasing area is determined based on a preset manipulation height and a lower margin of the smart terminal, the preset manipulation height is a preset distance between the bottom of the soft keyboard area and a lower bezel of a body of the smart terminal, and the lower margin of the smart terminal is a distance between a lower edge of displaying area of a screen of the smart terminal and the lower bezel of the body in the smart terminal;

adding, by changing a layout of an original input method window of an input method application, the height increasing area having the designated height to the bottom of the soft keyboard area of the original input method window to acquire the target input method window;

automatically displaying a floating window containing data to be pasted at a designated position of the target input method window, wherein the data to be pasted is data newly added to a clipboard; and when a paste instruction is triggered based on an operation on the floating window, responding to the paste instruction.

12. The electronic device according to claim 11, wherein a pre-configured paste state comprises one or more of: a close-after-paste state, a delayed close-after-paste state, and a retain-after-paste state;

responding to the paste instruction comprises one or more of:

when a current paste state is the close-after-paste state, performing operation of pasting the data to be pasted and closing the floating window;

when the current paste state is in the delayed-close-after-paste state, performing operation of pasting the data to be pasted and closing the floating window after a preset time period of delay is expired; or when the current paste state is in the retain-after-paste state, performing operation of pasting the data to be pasted and retaining display of the floating window; and wherein the paste instruction is capable of being triggered for multiple times during the display of the floating window.

13. The electronic device according to claim 12, wherein the processor is further configured to perform:

when a designated sliding event is detected based on an interface where the target input method window is located, performing a switching operation between the paste states.

14. The electronic device according to claim 12, wherein the processor is further configured to perform:

when a designated sliding event is detected based on an interface where the target input method window is located, switching to a designated paste state.

15. The electronic device according to claim 11, wherein the height increasing area comprises a clipboard shortcut control, and the designated position is a position adjacent to the clipboard shortcut control.

16. The electronic device according to claim 15, wherein the processor is further configured to perform:

when the clipboard shortcut control is triggered, displaying multiple pieces of data cached in the clipboard in chronological order of data being added to the clipboard.

17. The electronic device according to claim 11, wherein the processor is further configured to perform:

adding, by changing a layout of an original input method window of an input method application through a Hook mechanism, the height increasing area having the designated height to the bottom of the soft keyboard area of the original input method window to acquire the target input method window.

18. A non-transitory computer readable storage medium storing a computer program, the medium being applied to a smart terminal, when executing the computer program, a processor is caused to perform:

in response to acquiring an instruction to display an input method window, displaying a target input method window, wherein the target input method window comprises a soft keyboard area and a height increasing area having a designated height, and the height increasing area is located at a bottom of the soft keyboard area, and is configured to raise the soft keyboard area, the designated height of the height increasing area is determined based on a preset manipulation height and a lower margin of the smart terminal, the preset manipulation height is a preset distance between the bottom of the soft keyboard area and a lower bezel of a body of the smart terminal, and the lower margin of the smart terminal is a distance between a lower edge of displaying area of a screen of the smart terminal and the lower bezel of the body in the smart terminal;

adding, by changing a layout of an original input method window of an input method application, the height increasing area having the designated height to the bottom of the soft keyboard area of the original input method window to acquire the target input method window;

automatically displaying a floating window containing data to be pasted at a designated position of the target input method window, wherein the data to be pasted is data newly added to a clipboard; and when a paste instruction is triggered based on an operation on the floating window, responding to the paste instruction.

* * * * *